United States Patent Office.

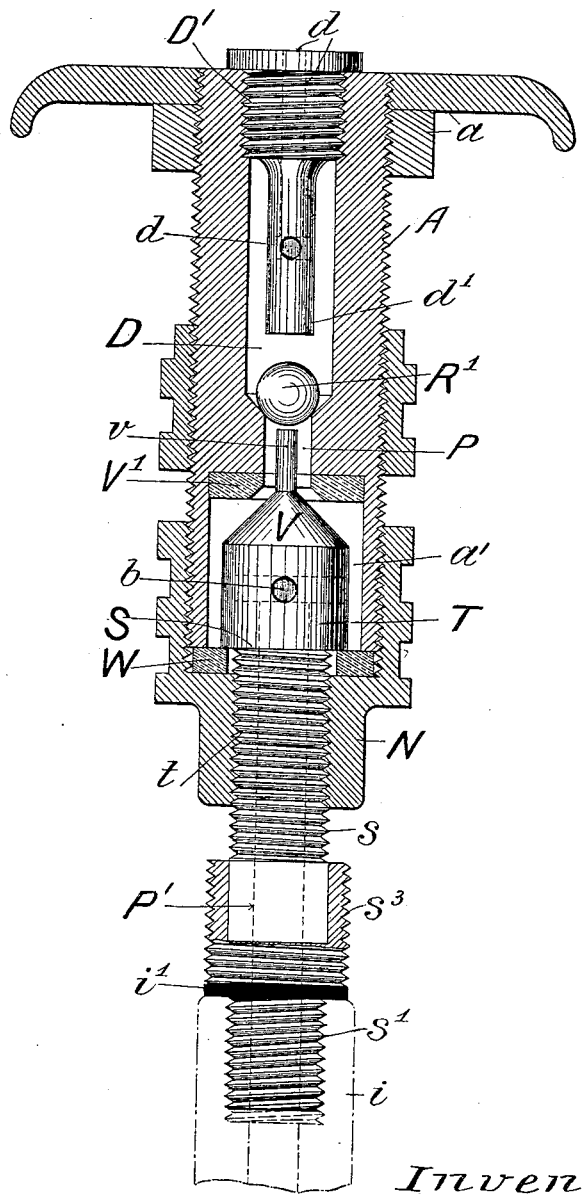

THOMAS HARRISON, OF GATESHEAD, ENGLAND.

VALVE FOR PNEUMATIC TIRES.

SPECIFICATION forming part of Letters Patent No. 633,585, dated September 26, 1899.

Original application filed October 2, 1897, Serial No. 653,837. Divided and this application filed August 26, 1898. Serial No. 689,610. (No model.)

*To all whom it may concern:*

Be it known that I, THOMAS HARRISON, a subject of the Queen of Great Britain and Ireland, residing at 172 Brinkburn avenue, Gateshead, in the county of Durham, England, have invented certain new and useful Improvements in Valves for Pneumatic Tires and other Purposes, (for which invention I have obtained patents in Great Britain, No. 7,457, dated March 23, 1897, and No. 11,467, dated May 8, 1897,) of which the following is a specification.

My invention relates to valves for pneumatic tires, and has for its object to provide a valve by which leakage is efficiently prevented and deflation and inflation of the tire readily accomplished.

To this end and according to my invention I arrange within the valve-casing two stop-valves and one non-return valve, the former controlling the inner passage to the air-tube and an outer passage to the atmosphere, the non-return valve controlling the air admission to the inflater and disposed between the inner stop-valve and air-tube, the latter valve carrying a part for operating the non-return valve for the purpose of deflation.

I will describe my invention in reference to the accompanying drawing, in which the figure is an enlarged sectional elevation of a valve constructed in accordance with my invention, and in which—

A is the valve-casing, having the usual means, as shown at $a$, for securing same to the tire or air-tube. Within the casing A is an inner tube or valve-carrying part T, of less diameter than the interior of the casing A, leaving an intervening annular space $a'$. The said tube T has at its inner end a stop-valve V, seated in an appropriately-formed part of the casing, or a washer, as at V', and controlling the admission of air to and from the air-tube by the passage P. At its outer end the part T has another stop-valve or means for securing an air-tight joint when screwed down, as at S. This may be formed by suitably reducing the part T, as shown, its seat being formed by a washer of vulcanized fiber or suitable material, such as W. The washer W also serves to make a tight joint between the outer casing and nut or cap N. The part T passes out, as at $t$, and is screwed or otherwise formed for reception of the inflater.

The non-return valve R' is shown in the form of a ball-valve arranged in a chamber or space D, formed in the end of the valve-casing nearest the air-tube, and has its seat at and controls the inner end of passage P, leading outwardly from the chamber D, the latter communicating with the air-tube by apertures or passages $d\ d$, arranged, as shown dotted, centrally or otherwise conveniently in a screwed part D', closing the inner end of the chamber D and having a projecting part or spindle $d'$, forming a guide or stop for the valve R'. The stop-valve V has a pin or projecting part $v$, adapted to raise the ball or non-return valve R' from its seat when partially or wholly screwed up.

In order that the valves may be readily operated and in a more or less automatic manner, I provide the extended part $t$ of the inner tube T with reversely-screwed parts $s\ s'$ and a fixed part $s^3$ at the junction of the reversely-screwed parts, so that on screwing on the inflater-nozzle, shown dotted at $i$, the latter will engage the part $s^3$, which may have a fixed washer $i'$, and further movement will unscrew the reversely-threaded part $s$, consequently drawing down the inner tube and opening the inner valve V, at the same time shutting the valve S, and the tire may be inflated. After inflation on unscrewing the nozzle $i$, the latter being tightly pressed against the part $s^3$, carries it with it and therefore at the same time screws up the tube T until the valve V comes upon its seat. Continued movement disengages the nozzle $i$ from the part $s^3$ and the nozzle is unscrewed and removed. The outer part of $s^3$ is screwed with a thread of the same kind as that upon the part $s$, so that the screwing of the dust-cap thereon, if at all, assists to shut and keep the valve V tight, and the valve may be opened or operated for use of the inflater by unscrewing the dust-cap; but should this fail to act the screwing on of the inflater-nozzle will complete the operation. A flexible washer may be fixed to the part $s^3$, as at $i'$, to assist the operation of the parts.

On application of the inflater the air entering the inner tube or part T by the passage P' passes out through apertures $b$, formed therein, to the space $a'$ between the part T and the outer casing, thence past the valve V and non-return valve R' to the air-tube by apertures $d\ d$. When inflation is complete, the valve V may be screwed up tight or the part T kept screwed down, as shown in the figure, and the pin $v$ being withdrawn allows the non-return ball R' to retain its seat, it alone being relied upon to keep the air in the tire.

One advantage of this construction of valve is that should the inflation-nozzle and outer removable parts of the valve be lost or stolen the air-pressure is still preserved by the non-return valve R', and the external nut or inflation-nozzle of many other valves at present in use may be used for inflation, the external screwed part being slightly tapered or otherwise formed to suit varying sizes of nuts or caps.

For deflation the stop-valve V if shut is partly opened, or if open is partly screwed up and the non-return valve R' being kept from its seat by the pin or projection $v$ the air passes outward into space $a'$ to the inner tube or part T through apertures $b$ and out by the inflation-passage P'.

Having now described my invention, what I claim, and desire to secure by Letters Patent, is—

1. The improvements in valves for pneumatic tires and the like comprising the combination of two stop-valves and one non-return valve the latter controlling an inner passage to the air-tube and arranged for deflation by a projection upon the inner stop-valve which controls a passage to the non-return valve and air-tube, the other stop-valve controlling an outer passage to the atmosphere substantially as set forth.

2. The improvements in valves for pneumatic tires and the like comprising the combination of a ball or non-return valve controlling an inner passage to the air-tube, a valve-carrying part T within an inner casing, said part or the valve thereon carrying an extended part adapted to raise the ball or non-return valve from its seat for deflation purposes, and an outward extension of the said inner valve-carrying part having reversely-screwed parts substantially in the manner and for the purposes set forth.

3. The improvement in valves for pneumatic tires and the like comprising the combination of the casing A, non-return valve R' arranged in a chamber D at the inner end of the casing, said chamber D being closed inwardly by a screwed part D' having projecting spindle $d'$ with air-passages $d$, the passage P passing outwardly from the valve R', the inner tube or part T adapted to be seated upon washer V' and having a projection $v$, the valve or enlarged part S seated on a washer W, the outward extension $t$ of the part T screwing in the cap N, and air-passages P' and $b$ within the part T all arranged substantially in the manner and for the purposes set forth.

4. The improvements in valves for pneumatic tires and the like comprising the combination of the casing A, non-return valve R' arranged in a chamber D at the inner end of the casing, said chamber D being closed inwardly by a screwed part D' having projecting spindle $d'$ with air-passages $d$, the passage P passing outwardly from the valve R', the inner tube or part T adapted to be seated upon washer V' and having a projection $v$, the outward extension $t$ with reversely-screwed parts $s\ s'$ and fixed part $s^3$ between the reversely-screwed parts, said fixed part $s^3$ being screwed as described for reception of the dust-cap, substantially in the manner and for the purposes set forth.

In witness whereof I have hereunto set my hand in presence of two witnesses.

THOMAS HARRISON.

Witnesses:
HENRY A. PRYOR,
EDMUND W. PATTISON.